United States Patent
Jirskog et al.

(10) Patent No.: US 9,513,153 B2
(45) Date of Patent: *Dec. 6, 2016

(54) RADAR LEVEL GAUGING USING FREQUENCY MODULATED PULSED WAVE

(75) Inventors: Anders Jirskog, Huskvarna (SE); Olov Edvardsson, Linkoping (SE); Jan Westerling, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 662 days.

This patent is subject to a terminal disclaimer.

(21) Appl. No.: 13/976,567

(22) PCT Filed: Dec. 29, 2011

(86) PCT No.: PCT/EP2011/074207
§ 371 (c)(1),
(2), (4) Date: Sep. 24, 2013

(87) PCT Pub. No.: WO2012/089796
PCT Pub. Date: Jul. 5, 2012

(65) Prior Publication Data
US 2014/0085132 A1    Mar. 27, 2014

Related U.S. Application Data

(63) Continuation-in-part of application No. 12/981,995, filed on Dec. 30, 2010, now Pat. No. 8,872,694.

(51) Int. Cl.
*G01S 13/08* (2006.01)
*G01F 23/284* (2006.01)
(Continued)

(52) U.S. Cl.
CPC ............. *G01F 23/284* (2013.01); *G01S 13/26* (2013.01); *G01S 13/88* (2013.01)

(58) Field of Classification Search
CPC ......... G01F 23/284; G01S 13/26; G01S 13/88
(Continued)

(56) References Cited

U.S. PATENT DOCUMENTS

| 3,216,010 A | 11/1965 | Roeschke |
| 3,623,097 A | 11/1971 | Femenias |

(Continued)

FOREIGN PATENT DOCUMENTS

| DE | 10 2005 057 094 A1 | 6/2007 |
| EP | 1 069 438 A1 | 1/2001 |

(Continued)

OTHER PUBLICATIONS

Office Action from U.S. Appl. No. 12/981,995, dated Sep. 12, 2013.
(Continued)

*Primary Examiner* — Frank J McGue
(74) *Attorney, Agent, or Firm* — Westman, Champlin & Koehler, P.A.

(57) ABSTRACT

A method for measurement of a distance to a surface of a product kept in a tank method comprises transmitting a pulse train of distinct carrier wave pulses having a duration greater than 1 microsecond and shorter than 100 milliseconds, the pulse train has an average duty cycle of less than 50 percent, each pulse has a defined center frequency, selected according to a frequency scheme within a predetermined frequency range, greater than 5% of an average center frequency. The method further comprises correlating actual phase properties of received pulses with expected phase properties to provide an updated estimation of the distance.

The present invention is based on transmitting a set of carrier wave pulses, each having a distinct frequency selected within a frequency range. The method is therefore referred to as a Frequency Modulated Pulsed Wave (FMPW).

31 Claims, 6 Drawing Sheets

(51) Int. Cl.
  *G01S 13/26* (2006.01)
  *G01S 13/88* (2006.01)
(58) Field of Classification Search
  USPC .......................................................... 342/124
  See application file for complete search history.

(56) References Cited

U.S. PATENT DOCUMENTS

| | | | |
|---|---|---|---|
| 3,725,924 A | 4/1973 | Easton | |
| 4,044,353 A | 8/1977 | Levy | 342/124 |
| 4,293,934 A | 10/1981 | Herolz et al. | 367/27 |
| 4,661,817 A * | 4/1987 | Bekkadal | G01S 11/023 342/124 |
| 4,914,441 A | 4/1990 | Brookner | |
| 5,130,714 A | 7/1992 | Taylor | 342/132 |
| 5,406,842 A | 4/1995 | Locke | 73/290 |
| 5,440,310 A | 8/1995 | Schreiner | 342/124 |
| 5,504,490 A | 4/1996 | Brendle et al. | |
| 5,546,088 A | 8/1996 | Trummer et al. | 342/124 |
| 5,689,265 A | 11/1997 | Otto et al. | 342/124 |
| 6,107,957 A | 8/2000 | Cramer et al. | 342/124 |
| 6,137,438 A | 10/2000 | McEwan | 342/134 |
| 6,415,660 B1 | 7/2002 | Sinz et al. | 73/290 R |
| 6,642,884 B2 | 11/2003 | Bryant et al. | 342/357.64 |
| 6,680,690 B1 | 1/2004 | Nilsson et al. | 342/124 |
| 7,053,630 B2 * | 5/2006 | Westerling | G01F 23/284 324/639 |
| 7,079,029 B2 | 7/2006 | Tsuji | 340/552 |
| 7,230,980 B2 | 6/2007 | Langford et al. | 375/219 |
| 7,482,818 B2 | 1/2009 | Greenwald et al. | |
| 8,044,844 B2 | 10/2011 | Nyberg | 342/124 |
| 8,497,799 B2 * | 7/2013 | Kleman | G01F 23/284 342/118 |
| 8,730,093 B2 | 5/2014 | Edvardsson et al. | |
| 8,854,253 B2 | 10/2014 | Edvardsson | |
| 8,872,694 B2 * | 10/2014 | Edvardsson | G01F 23/284 342/124 |
| 2002/0020216 A1 * | 2/2002 | Schultheiss | G01F 23/284 73/290 V |
| 2006/0012512 A1 | 1/2006 | Jirskog | 342/124 |
| 2007/0109177 A1 | 5/2007 | Baath et al. | 342/124 |
| 2007/0186678 A1 | 8/2007 | Griessbaum et al. | 73/861 |
| 2008/0105048 A1 | 5/2008 | Nilsson et al. | 73/290 |
| 2008/0143583 A1 | 6/2008 | Welle et al. | |
| 2009/0051581 A1 | 2/2009 | Hatono | 342/33 |
| 2010/0067570 A1 | 3/2010 | Lipp | 375/228 |
| 2010/0175470 A1 | 7/2010 | Schrier et al. | 73/290 |
| 2010/0265121 A1 | 10/2010 | Bandhauer et al. | 342/135 |
| 2011/0140951 A1 | 6/2011 | Nyberg | 342/124 |
| 2011/0161019 A1 | 6/2011 | Mayer | |
| 2011/0187583 A1 | 8/2011 | Nouvel et al. | 342/129 |
| 2012/0169528 A1 | 7/2012 | Edvardsson et al. | |
| 2013/0076559 A1 | 3/2013 | Edvardsson | 342/124 |
| 2013/0076560 A1 | 3/2013 | Edvardsson et al. | 342/124 |

FOREIGN PATENT DOCUMENTS

| | | |
|---|---|---|
| EP | 2 166 671 | 3/2010 |
| GB | 2123237 | 6/1982 |
| JP | 2004-301617 | 10/2004 |
| WO | WO 00/73747 A1 | 12/2000 |
| WO | WO 01/46653 | 6/2001 |

OTHER PUBLICATIONS

Office Action from U.S. Appl. No. 13/246,265, dated Nov. 5, 2013.
Office Action dated Feb. 20, 2014 in related application U.S. Appl. No. 12/981,995, filed Dec. 30, 2010. 15 pgs.
International Search Report for PCT Application No. PCT/EP2011/074207, dated Apr. 2, 2012, 4 pages.
Written Opinion for International Search Report for PCT Application No. PCT/EP2011/074207, dated Apr. 2, 2012, 8 pages.
"Microwave Surface Level Monitor"; Stuchly et al., IEEE Transactions on Industrial Electronics and Control Instrumentation, vol. IECI-18, No. 3, Aug. 1971, pp. 85-92, 8 total pages.
Office Action from U.S. Appl. No. 12/981,995, dated Mar. 15, 2013.
Written Opinion for International Search Report for PCT Application No. PCT/EP2011/066875, dated Jun. 1, 2012, 10 pages.
International Search Report for PCT Application No. PCT/EP2011/066896, dated Jun. 5, 2012, 4 pages.
Written Opinion for International Search Report for PCT Application No. PCT/EP2011/066896, dated Jun. 5, 2012, 9 pages.
Stuchly et al., "Microwave Surface Level Monitor", IEEE Transactions on Industrial Electronics and Control Instrumentation, vol. IECI-18, No. 3, Aug. 1971, 8 pages.
Merrill Skolnik, "Introduction to Radar Systems, passage", Introduction to Radar Systems (Second Edition), McGraw-Hill, SG, pp. 88-91, XP002548186, Jan. 1, 1980, ISBN: 978-0-07-057909-5, 4 pages.
Saunders, W.K., "Post-War Developments in Continuous-Wave and Frequency-Modulated Radar", IRE Transactions on Aeronautical and Navigational Electronics, IEEE, USA, vol. ANE-2, No. 1, Mar. 1, 1961, pp. 7-19, XP011245965, ISSN: 0096-1639, 14 pages.
International Search Report for PCT Application No. PCT/EP2011/066875, dated Jun. 1, 2012, 4 pages.

* cited by examiner

RADAR LEVEL GAUGING USING FREQUENCY MODULATED PULSED WAVE

CROSS-REFERENCE TO RELATED APPLICATION

This application is a Section 371 National Stage Application of International Application No. PCT/EP2011/074207, filed 29 Dec. 2011 and published as WO 2012/089796 on Jul. 5, 2012, in English, the contents of which are hereby incorporated by reference in their entirety.

FIELD OF THE INVENTION

The present invention relates to a radar level gauge using electromagnetic waves to determine a distance to a surface of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 25-27 GHz, or 9.5-11 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency but practically constant amplitude. An example of such a stepped FMCW is disclosed in U.S. Pat. No. 5,406,842. For a number of discrete frequencies a phase shift is determined, and based on a set of such phase shifts an IF signal is obtained, having the same properties as the continuous IF signal described above. In principle, this requires a number of frequencies, N, greater than a number stipulated by the sampling theorem. The distance to the reflecting surface is then determined using the frequency of the IF signal in a similar way as in a conventional FMCW system. Typical values can be 200-300 IF periods at 30 m distance divided in 1000-1500 steps.

Although highly accurate, FMCW systems are relatively power hungry, making them less suitable for applications where power is limited. Examples of such applications include field devices powered by a two-wire interface, such as a 4-20 mA loop, and wireless devices powered by an internal power source (e.g. a battery or a solar cell).
General Disclosure of the Invention It is an object of the present invention to provide an improved method for radar level gauging, with lower power requirements than the conventional FMCW method.

According to a first aspect of the present invention, this and other objects are achieved by a method for measurement of a distance to a surface of a product kept in a tank.

The method comprises transmitting low power electromagnetic transmit signals towards the surface, receiving electromagnetic return signals reflected at the surface, determining the distance based on an initially estimated distance and a relationship between the transmit signals and the return signals. The transmit signals are formed as a pulse train of distinct carrier wave pulses having a duration greater than 1 microsecond and shorter than 100 milliseconds, the pulse train has an average duty cycle of less than 50 percent, each pulse has a defined center frequency, selected according to a frequency scheme within a predetermined frequency range, greater than 5% of an average center frequency. The method further comprises determining actual phase properties of each distinct pulse received in relation to each corresponding distinct pulse transmitted, determining, based on the initially estimated distance, expected phase properties of each received distinct pulse in relation to each corresponding transmitted distinct pulse, and correlating the actual phase properties with the expected phase properties to provide an updated estimation of the distance.

The present invention is based on transmitting a set of carrier wave pulses, each having a distinct frequency selected within a frequency range. The method is therefore referred to as a Frequency Modulated Pulsed Wave (FMPW).

Unlike the method referred to above as stepped FMCW, the number of different carrier wave frequencies in a measurement cycle is insufficient to provide a continuous IF signal, or even an approximation of the IF frequency used in a conventional FMCW system. Instead, the small set of frequencies is chosen according to a specified frequency scheme, and a phase shift in the received pulse is determined for each frequency. The set of phase shifts allow a determination of a change compared to a previously recorded distance to the reflecting surface. In most applications the user requires an updating rate in the order of once per second and then the level change between two measurements is small.

As the pulses are emitted and processed distinctly, and independently of each other, the duty cycle of the transmit signal can be reduced, and is less than 50%. In some embodiments of the invention it is significantly less, and may be 5% or even 1% or lower. This means that individual pulses may be emitted with a relatively high power, without increasing the average power of the measurement cycle. This makes the present invention particularly useful in situations where power is scarce, such as in a field unit powered by an industrial current loop (e.g. 4-20 mA loop) or in a battery power (or solar powered, etc) field unit.

The correlating can include determining a distance offset based on the actual phase properties and said expected phase properties for each carrier wave frequency, and determining the updated estimation of the distance based on the initially estimated distance and the distance offset.

Alternatively, the correlating can include determining a relationship between actual phase and carrier wave frequency. Such a relationship may be expressed as a slope of a line in a diagram, which slope indicates the distance.

The order of the pulses with difference frequencies is not critical for the determination of the distance, and the pulses may for example be transmitted in ascending or descending order, or any mixed order.

The frequency scheme may be designed in various ways, and may include dividing an overall frequency range (e.g. in the order of GHz) into a number of subranges, and defining a subset of discrete frequencies for each subrange. The schedule may further include randomly selecting one frequency each from each frequency subset.

According to one embodiment of the invention, the schedule is adaptive, i.e. it may vary depending on the current measuring situation. For example, it may be advantageous to increase the number of pulses when more difficult measuring conditions are at hand. Such difficult measuring conditions may include a disturbed or quickly moving surface, and may present themselves as an increased uncertainty in the measurement result (quantified e.g. as a variance or standard deviation).

In this case, the schedule may include several accuracy levels, each including a different number of frequencies. When a measurement result acquired using one accuracy level becomes too uncertain, the accuracy level is increased, and a larger number of pulses with different frequencies are used in the next cycle.

Conventional FMCW with a linear or stepped sweep converts the set of echoes from various distances in the tank to a "tank spectrum". The interesting echo may be filtered out to decrease disturbing echoes from other parts of the tank. This is not possible with the simplest type of MFPW according to the present invention. To improve the situation it may be advantageous to introduce a frequency modulation of the carrier wave, and to mix the received signal with the modulation frequency, in order to provide dependence on the distance. This dependence can be used to eliminate undesired echoes by low pass filtering.

The transmitter signal is preferably frequency modulated by a suitable frequency $f_m$ (several complete periods within each pulse), providing a variation of the carrier frequency within a frequency band $\delta f$ in the order of MHz. With such modulation, two advantages are available:
1. The signal can be received around $f_m$ or a multiple of $f_m$ (instead of DC) which will make it less sensitive for 1/f noise and transient-like disturbances.
2. A distance dependence is introduced, which might be advantageous for instance to limit the echo competition to the nearest ±1 m etc.

A second aspect of the present invention relates to a system for FMPW, comprising a transceiver for transmitting low power electromagnetic transmit signals and receiving electromagnetic return signals reflected at the surface, and processing circuitry for determining the distance based on an initially estimated distance and a relationship between the transmit signals and the return signals. The transceiver is arranged to form the transmit signals as a pulse train of distinct carrier wave pulses having a duration greater than 1 microseconds and shorter than 100 milliseconds, the pulse train having an average duty cycle of less than 50 percent, each pulse having a defined center frequency, selected according to a frequency scheme within a predetermined frequency range, greater than 5% of an average center frequency. The processing circuitry is arranged to determine actual phase properties of each distinct pulse received in relation to each corresponding distinct pulse transmitted, determine, based on the initially estimated distance, expected phase properties of each received distinct pulse in relation to each corresponding transmitted distinct pulse, and correlate the actual phase properties with the expected phase properties to provide an updated estimation of the distance.

In order to minimize energy consumption in a Multiple Frequency Pulsed Wave (MFPW) radar level gauging system, as described above, it has been found to be advantageous to use a small number of frequencies for providing an updated estimation of the distance to the surface of the product in the tank. As indicated, several variations of this principle are possible. However, occasionally, a Frequency Modulated Continuous Wave (FMCW) frequency sweep measurement can be inserted to verify or correct the updated estimation of the distance obtained through MFPW distance measurement. Also, a new, initially estimated distance may be provided based on such FMCW measurement or on the updated estimation of the distance or a combination thereof. Further, the FMCW frequency sweeps for estimating the distance are advantageously inserted at different times that depend on the measurement situation or at predetermined time intervals. The measurement situation, as pertaining to echoes received from the tank, could be characterized as, for instance, still surface, slowly moving surface, rapidly moving surface, and existence of disturbing echoes (from structures inside tank at certain locations).

The above-described procedure of inserting FMCW frequency sweeps is applicable to both the method and the system aspects of the invention.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present description, embodiments of the present invention are mainly described with reference to a radar level gauge system having a free propagating antenna for radiating and capturing electromagnetic signals. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Figure 1:
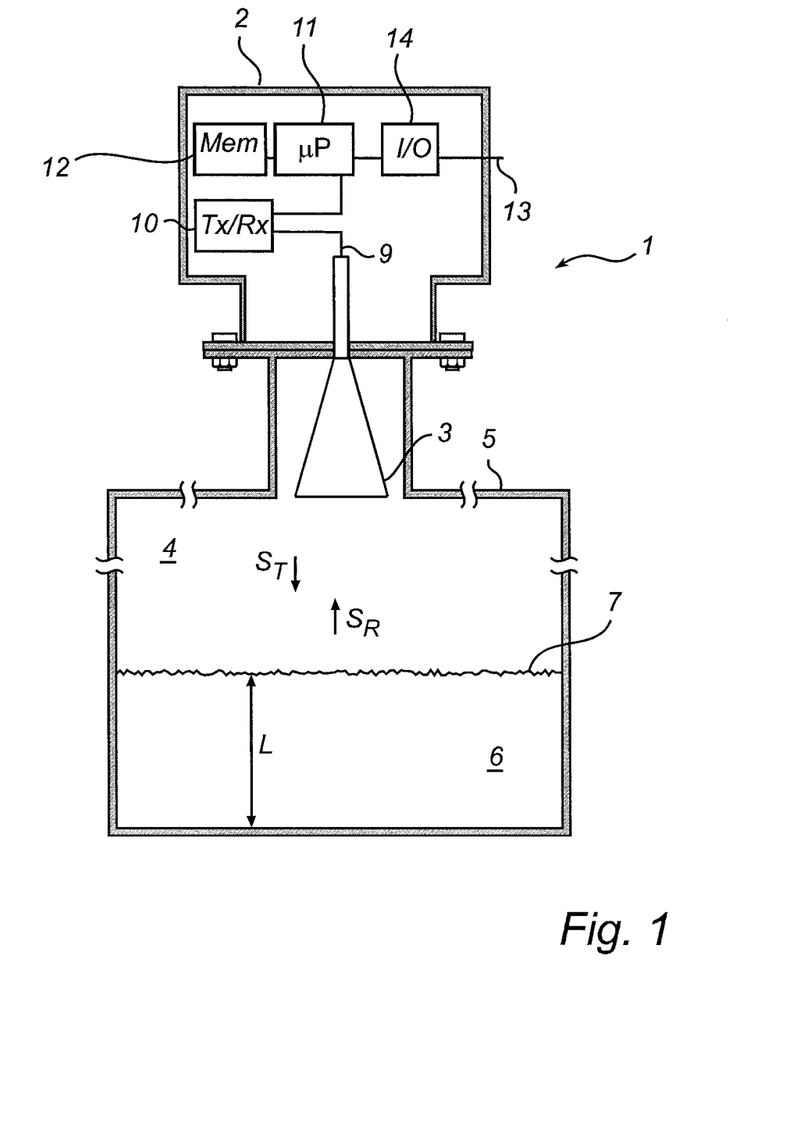
FIG. 1 is a schematic block diagram of a radar level gauge mounted on a tank.

FIG. 1 schematically illustrates a radar level gauge system 1 according to an embodiment of the present invention, comprising a measurement electronics unit 2, and a signal propagating device, here a horn antenna 3. The radar level gauge system 1 is provided on a tank 5, which is partly filled with a product 6 to be gauged. In the case illustrated in FIG. 1, the product 6 is a solid, such as grain or plastic pellets, which is well-known to represent a difficult application requiring a relatively high measurement sensitivity of the radar level gauge system. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner.

As is schematically illustrated in FIG. 1, the electronics unit 2 comprises a transceiver 10 for transmitting and receiving electromagnetic signals, which is connected to the antenna 3 via a wave guide 9. The unit 2 further comprises a processing circuitry 11, which is connected to the transceiver 10 for control of the transceiver and processing of signals received by the transceiver to determine the filling level of the product 6 in the tank 5. The processing circuitry 11 is also connected to a memory 12, storing any software required for the operation of the gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. The current in the lines is regulated in accordance with a measurement result determined by the processing circuitry 11.

Alternatively, the gauge may communicate wirelessly with the control station using e.g. a Wireless HART protocol, and use a local power supply with batteries or other means of scavenging energy for autonomous operation.

Although being shown as separate blocks in FIG. 1, several of the transceiver 10, the processing circuitry 11 and the interface 12 may be provided on the same circuit board.

Figure 2:
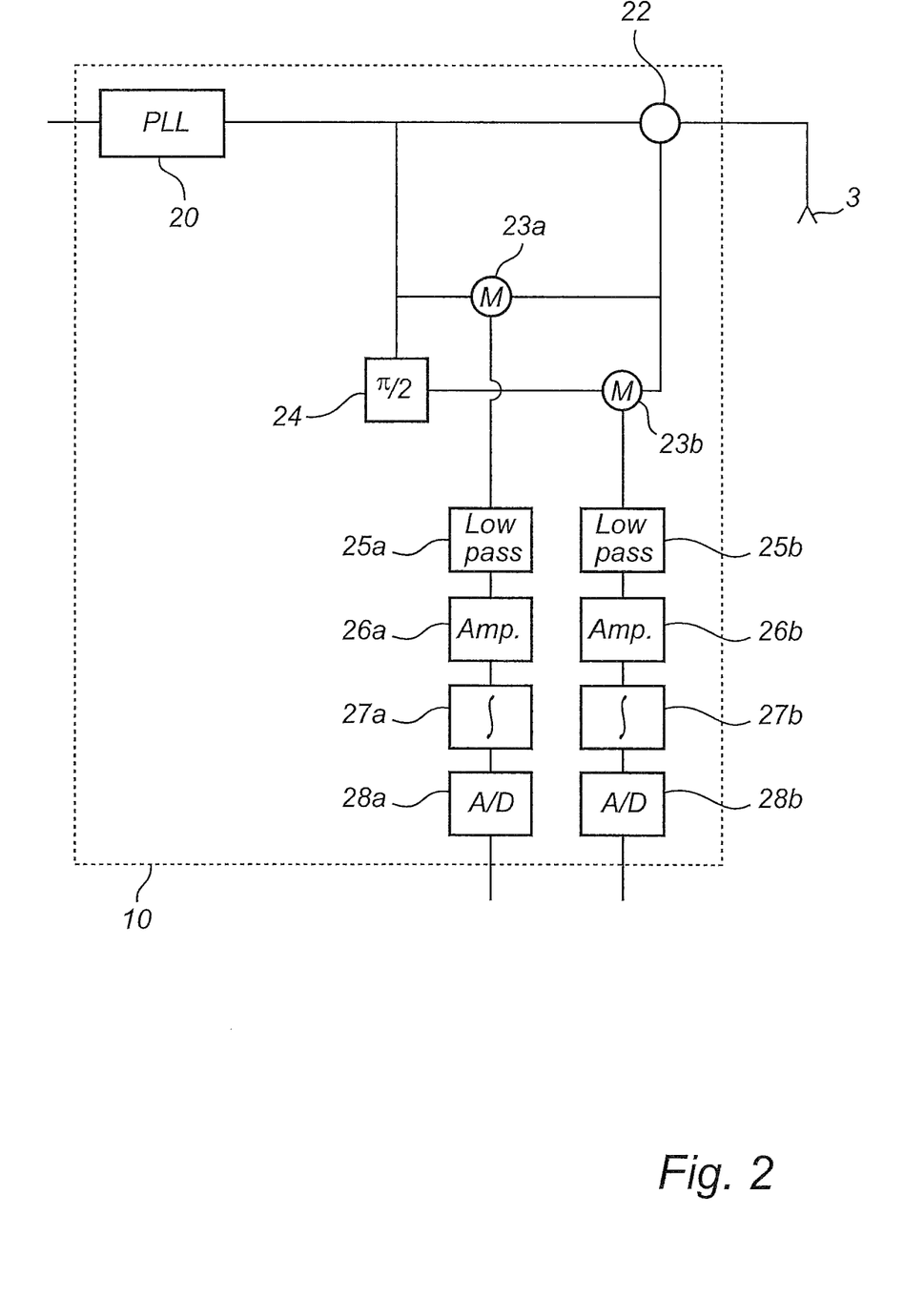
FIG. 2 is a more detailed block diagram of the transceiver in FIG. 1, according to a first embodiment of the present invention.

FIG. 2 schematically shows an exemplary transceiver 10 suitable for implementing an embodiment of the present invention.

A signal generator 20 is arranged to generate carrier wave pulses with a well defined and accurately controlled carrier frequency. The accuracy deviation should be less than 1/1000, and preferably less than 1/10000 or better. This may be achieved with a feed back control system, and the signal generator may for example be a phase locked loop, PLL.

In the illustrated example discussed herein, the pulse duration will be assumed to be about 2 ms, but significantly shorter pulses, e.g. in the order of µs are also possible. It should be noted that in a tank gauging context, pulses of a duration in the order µs or ms, as mentioned here, are much too long to enable pulsed distance measurement with time domain reflectometry, i.e. to receive a reflected pulse and determine its time of flight. The pulses according to the present invention are thus longer than pulses in conventional pulsed radar level gauges, where a typical pulse duration is in the order of ns.

The average power of the pulses can be in the nW or µW area. However, the duty cycle, i.e. the relationship between the pulses and the intervals there between, should be limited to less than 50%, and is preferably significantly lower, e.g. 5% or even 1% or less. Compared to conventional FMCW, this means that the pulses may be emitted with a relatively high power, without increasing the average power of the measurement cycle.

The pulses are typically radar pulses, with a carrier wave frequency in the GHz area, e.g. in the range 9.5-11 GHz or 24-26 GHz. The duration of the pulses, the duty cycle, and the frequency of the PLL are controlled by the processor 11 (see FIG. 1).

A circulator, or a power divider such as a Wilkinson Power Divider (WPD) 22, is provided to direct the signal from the signal generator 20 to the antenna 3 in the tank 5 and to direct reflected signals from the antenna 3 to a receiver section of the transceiver 10.

The receiver section comprises two channels, an in-phase channel (I) and a quadrature channel (Q), each comprising a mixer 23a, 23b for homodyne mixing of the received signal. The first mixer 23a is provided with the transmitted pulses directly from the PLL 20 (I-channel). The second mixer 23b is provided with the transmitted pulses from the PLL 20 via a 90 degrees phase shifter 24 (Q-channel).

Each channel comprises a low pass filter 25a, 25b and an amplifier 26a, 26b. The filters and amplifiers improve the signal-to-noise ratio of the radar level gauge system.

The low pass filters 25a, 25b preferably have a bandwidth corresponding to the inverse of the pulse width. In other words, if the duration of the pulse is 2 ms, a suitbale filter will be 500 Hz wide. Longer pulses can thus be used to increase the sensitivity (smaller bandwidth) at the expense of the average power. However, if a low duty cycle is desired, in order to achieve a low average power consumption, the pulses should be kept reasonable short, and the bandwidth of the low pass filters 25a, 25b must then be wider (with less sensitivity) than a conventional FMCW.

The signals are then supplied to two integrators 27a, 27b, for integrating the signals over the length of the pulse. Finally two A/D-converters 28a, 28b are arranged to A/D convert the integrated value, and the digital output is supplied to the processor 11 for storage and processing.

The embodiment in FIG. 2 may be sensitive to disturbing echoes, as it is not possible to filter out a relevant portion of the reflected signal. In other words, this embodiment is best suited for measuring conditions where the surface reflection dominates any other reflections.

Figure 3:
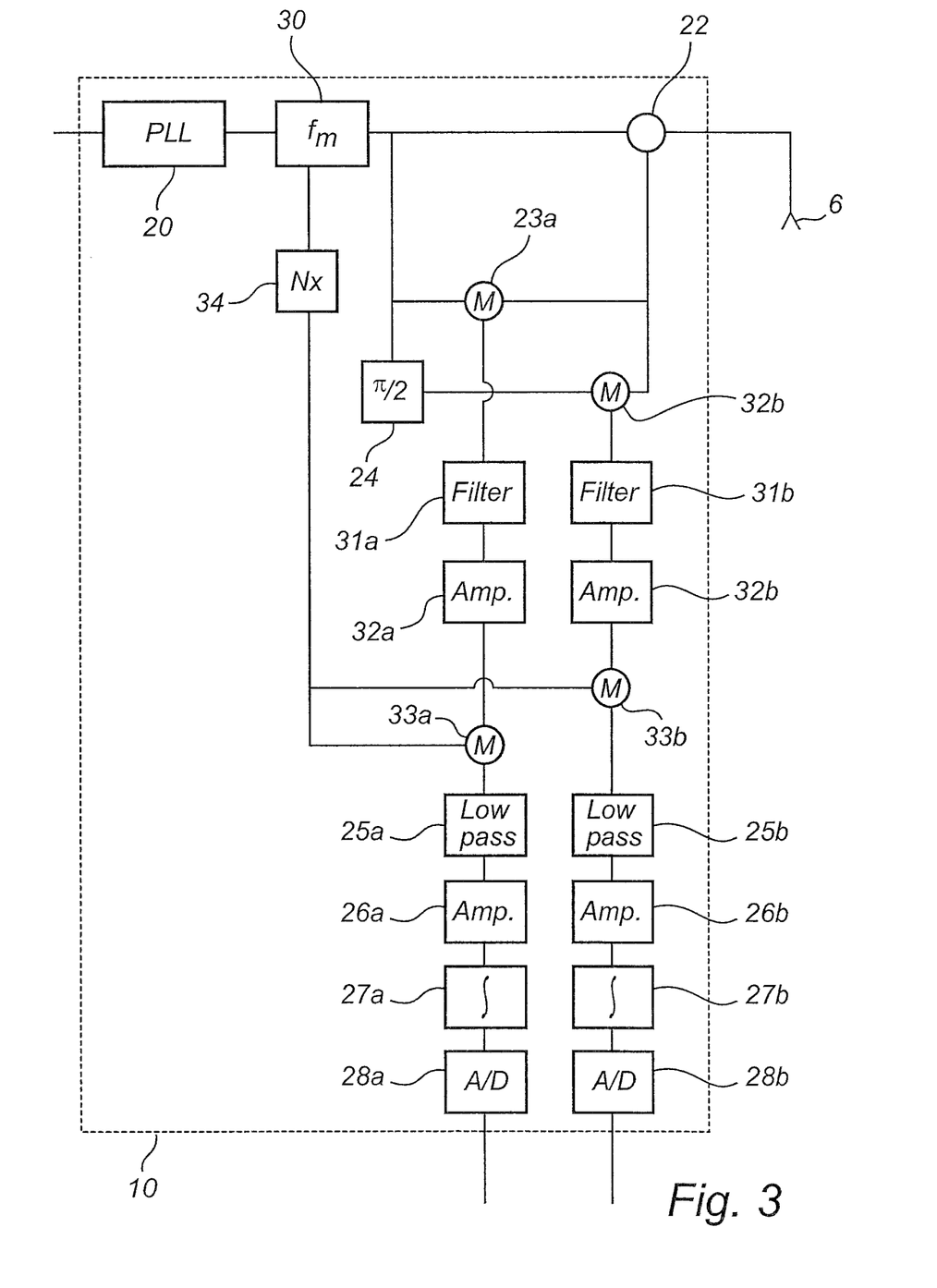
FIG. 3 is a more detailed block diagram of the transceiver in FIG. 1, according to a second embodiment of the present invention.

FIG. 3 shows a transceiver according to a further embodiment of the present invention, introducing a modulation of the carrier wave. This modulation is not necessary for the general principle of the present invention, but may serve to improve reliability, as will be explained below.

Figure 6:
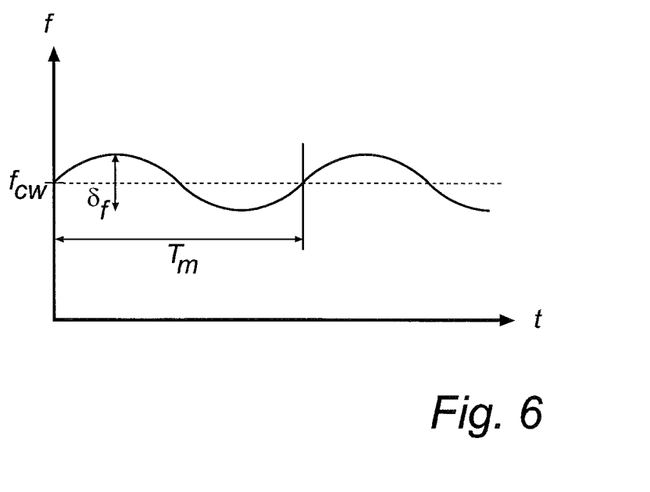
FIG. 6 illustrates frequency modulation of a carrier wave.
Figure 7:
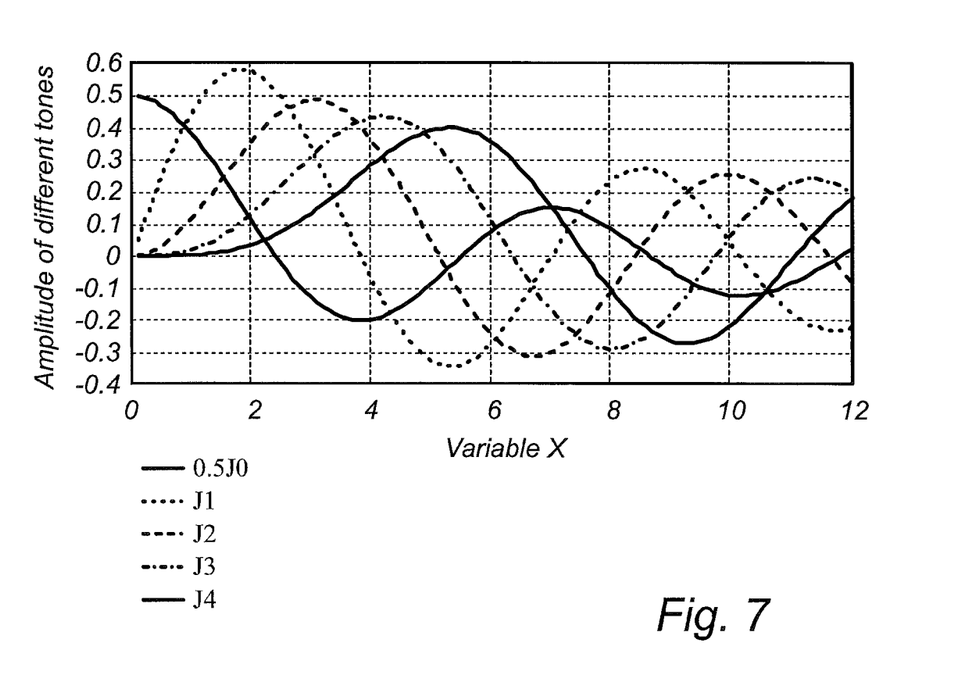
FIG. 7 shows the first five harmonics for sinusoidal modulation.
Figure 8:
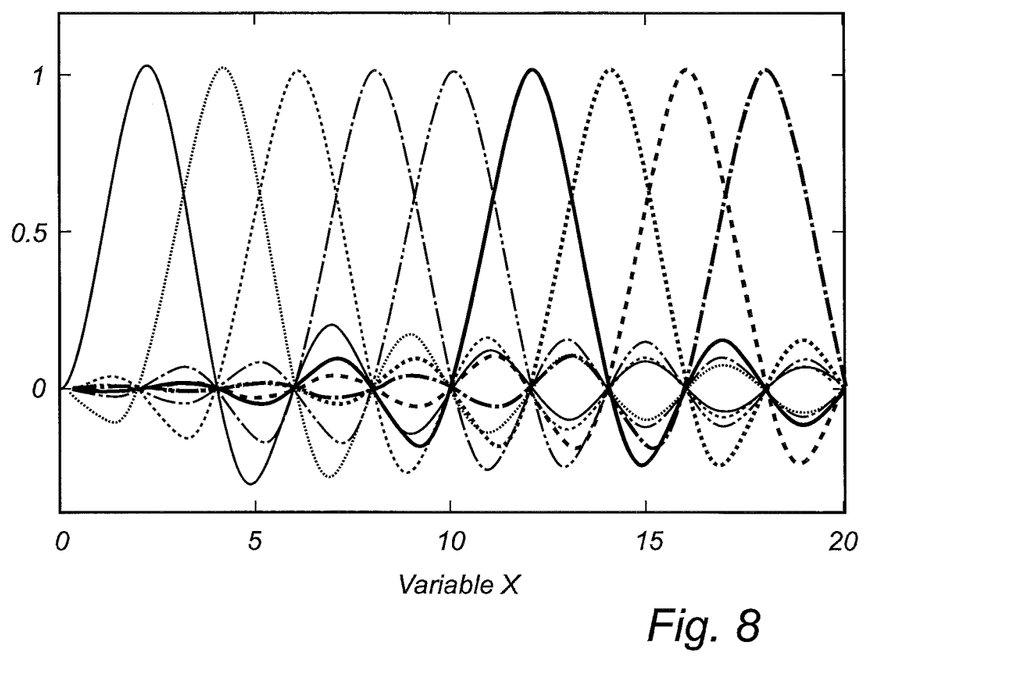
FIG. 8 shows Fourier coefficients for even tones for triangular modulation.

Referring to FIG. 3, the PLL 20 is connected to a modulator 30, arranged to frequency modulate the pulses from the PLL 20 with a modulating frequency $f_m$. The frequency variation of the modulated carrier wave is shown in FIG. 6. The modulation frequency should be chosen with respect to the pulse duration to ensure that a complete number of modulation periods ($P_{mod}$) are included in each pulse. In the present example, where the pulse length is in the order of ms, the modulating frequency should be in the order of kHz, and may for example be 10 kHz. For a µs pulse duration, the modulating frequency should be in the order of MHz.

The modulation has an amplitude selected to introduce a variation of the carrier wave frequency δf, which is significantly smaller than the predetermined frequency range of the measurement. As mentioned, the predetermined range of carrier wave frequencies used in the frequency scheme may be in the order of 1 GHz, and the modulation δf can then suitably be in the order of MHz.

In this embodiment, the output from the mixers 23a, 23b will not be DC level signals, but instead be IF (intermediate frequency) signals including the modulation frequency $f_m$ and harmonics thereof. The mixers 23a, 23b are connected to band pass filters 31a, 31b, arranged to filter out the desired frequency content. As discussed below, this is typically one of the first harmonics of $f_m$. The filtered signals are amplified by amplifiers 32a, 32b.

Each channel then comprises a second set of mixers 33a, 33b, which also receive as input the modulation frequency $f_m$ from modulator 30, via a multiplier 34. The multiplier 34 is adapted to provide a multiple N of the modulation frequency $f_m$, corresponding to the harmonic that has been filtered out by filters 31a, 31b. For example, if the first harmonic is selected, N=2.

The output from the mixers 33a, 33b will be DC level signals, which are fed to low pass filters 25a, 25b, amplifiers 26a, 26b, integrators 27a, 27b and A/D converters 28a, 28b, corresponding to the elements in FIG. 2.

Figure 5:
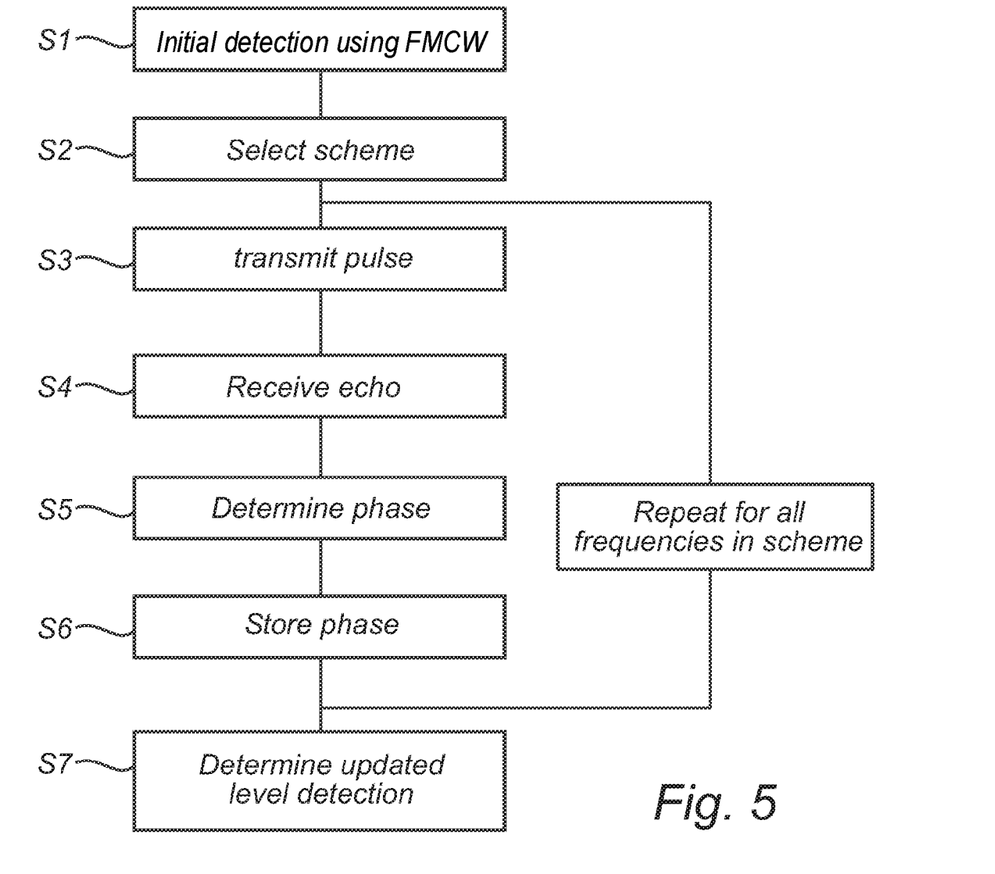
FIG. 5 is a flow chart of a method according to an embodiment of the present invention.

Depending on the type of frequency modulation introduced by the modulator 30 (sinusoidal, triangular etc.) the IF signal output by mixers 25a, 25b will have a distance dependence and will be spread over different harmonics. If the transmitted signal has a sinusoidal modulation with modulation width $\delta f$, the received signal after the homodyne mixing can be described by Bessel functions as harmonics of $f_m$ as illustrated in FIG. 5.

The argument in the Bessel functions is $X=2\pi h \delta f/c$, where h is the distance to the reflecting surface and c is the speed of light in vacuum. With increasing distance h (and thus increasing X) the received signal is spread over more harmonics. If, for example, the modulation width $\delta f$ is 15 MHz and the distance h is 10 m, the argument X will be ~2.0 and most received signal will occur in $f_m$. The distance dependence of J1(X) (for X smaller than 2) has the same feature as the high-pass filtering in conventional FMCW-systems, i.e. to reduce the dynamic range ~20 dB by having an amplitude distance dependence counteracting the 1/h-dependence. If a fixed $\delta f$ is used it will be limited to 8-10 MHz to measure up to 20-25 m without losing too much amplitude by spreading power to too many other harmonics.

It is also possible to pick out the second tone, $2f_m$, which is more efficient to suppress close echoes and allows 12-15 MHz modulating width in applications to 20-25 m. Note that in some cases the filters 31a, 31b are determined by hardware, and not variable. Instead, it is the modulator frequency $f_m$, modulating width $\delta f$, and factor N that are varied in order to achieve the desired filtering.

An alternative to sinusoidal modulation is triangular frequency modulation which has different properties, and may be more efficient than sinusoidal modulation.

The resulting Fourier coefficients for the even harmonics ($2f_m$, $4f_m$, etc) at triangular modulation are shown in FIG. 6. The coefficients for 1, 3 etc. are very similar to those for 2, 4 etc. The peaks are all close to 1 so if the closest harmonic is filtered out nearly all signal power is used. The argument X is the same as above, so a wider $\delta f$ may be used in the case of triangular modulation. At 50 MHz modulation width the full axis in the diagram above (0<x<20) corresponds to 0-30 m distance. With 50 MHz modulation width the spectral density can be reduced 17 dB without reducing the received signal. This reduction will remain also for long pulses.

Just as for sinusoidal modulation, the filtering can be changed between different harmonics, either by variable (digital) filters, or by varying $f_m$ to fit the suitable harmonic to a fixed filter. In this way the function will be rather close the conventional FMCW-system using a filter to pick out the signal to accurate differential phase calculation.

By selecting a plurality of harmonics a simple distance estimation may further be achieved. Basically, each harmonics represents a given distance range. By determining the received power in several such ranges, and correlating them to each other, the distance may be estimated. Such distance estimation is known in the art, and may be useful in particular under noisy conditions, such as when the surface is turbulent.

Figure 4:
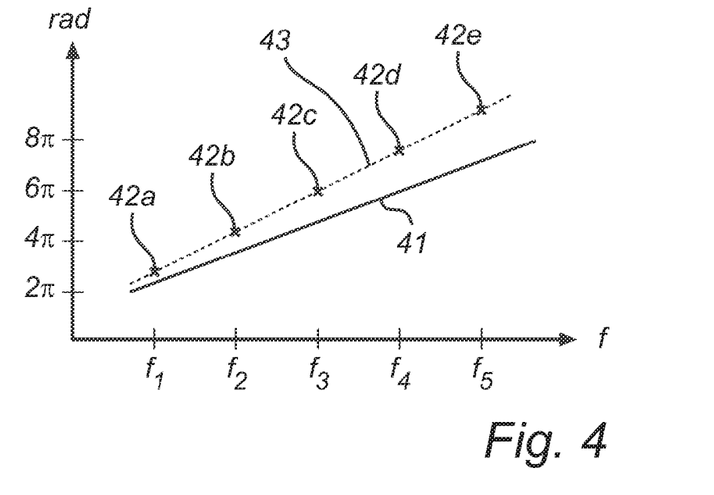
FIG. 4 is a diagram showing phase versus transmitted frequencies.

The operation of the gauge according to an embodiment of the invention will now be disclosed with reference to FIGS. 4 and 5. The curve 41 in FIG. 4 corresponds to a distance measurement completed during an initialization phase (step S1 in FIG. 5). This measurement can have been accomplished by a conventional radar level gauging method, such as FMCW (continuous or stepped) or TDR. It may also have been accomplished by any other detection method available, including a differential pressure detection and an induction detection.

Regardless of how the measurement has been completed, the detected distance can be converted into phase differences any given frequency. The curve 41 in FIG. 4 corresponds to a set of such phase differences.

A measurement cycle according to an embodiment of the present invention can now be performed. First, in step S2, a frequency scheme is determined according to a predefined procedure. In one embodiment, this procedure includes selecting one frequency from each of N subsets of frequencies in the sweep range. The sweep range may be in the order of 10% of the operating frequency, and may be e.g. between 25 and 27 GHz, or between 9.5 and 11 GHz. The number of frequency subsets N may preferably be determined based on the conditions prevalent in the tank. During advantageous conditions (slowly moving surface, small noise, no or weak disturbing echoes) a small number of frequencies may be sufficient, and N may be less than 10. During intermediately difficult conditions, N may be in the range 10-100, and for even more difficult conditions, N may be greater than 100. As comparison, a conventional stepped FMCW measurement typically includes around 2000 frequencies.

The N frequencies may be selected randomly from the N subsets. Further, the frequencies need not be in magnitude order, so the pulse frequency may alternate up and down.

In the illustrated example, the scheme comprises five different frequencies, spread out over a 2 GHz range.

Then, in step S3-S5, the sweep is performed with the selected frequencies in the selected order. For each frequency, a pulse of a determined duration, e.g. 2 ms, is generated by the PLL 20 and transmitted as signals ST into the tank by the antenna 3 (step S3).

The transmitted electromagnetic signals ST are reflected at impedance transitions in the tank 5, including the surface 7 of the product 6 contained in the tank 5, and are returned to the transceiver 10 as echo signals SR by the antenna 3. The reflected signal SR is received (step S4) by the two channels (I and Q) in the receiver side of the transceiver 10.

Then, in step S5, a phase difference between the transmitted pulse and the reflected pulse is determined by the processor 11 using the output from the two channels and conventional I/O processing.

The various phase shifts are recorded in memory 13 (step S6), and steps S3-S6 are repeated for all frequencies in the scheme.

In step S7, each phase difference value (which is in the range 0-2 pi) is correlated to an expected phase difference value, calculated based on the detected distance. In FIG. 4, the various phase differences 42a-f have been plotted just above the line 41.

The difference between the expected phase and the actual, detected phase corresponds to a distance offset. In principle, one such offset, resulting from a single frequency, is sufficient to provide an updated distance detection. However, the uncertainty in such a detection will normally be too significant to provide satisfactory reliability, and some kind of statistical analysis will normally be required.

One approach is to determine an average distance offset defined by the average difference between the actual, detected phase compared to the expected phase.

Another approach is to identify a straight line (dotted line 43) which is correlated to the five phase shift values (e.g. in the least square sense). The slope of this line can be converted to a detected distance.

Note that the number of pulses used (number of different frequencies) is too small to provide a uniquely defined distance measurement by themselves. In the approaches above, knowledge of a previously detected distance (the straight line 41) is therefore used to provide expected phase values, and eventually a distance estimation. If a previous detection is not available, or deemed desirable, it may be possible to determine an estimated distance by simulation.

Preferably, at start up of the radar level gauging system according to the invention, an initially estimated distance to the surface is determined by using one or a few full FMCW frequency sweeps. The initially estimated distance is thus determined by evaluation according to the FMCW radar principle, or variations thereof, which are well-known in the art.

In continuous operation, the level gauging system repeatedly carries out MFPW measurements in accordance with the invention. Depending on the measurement situation or after a certain time interval, one or several FMCW frequency sweeps are carried out again for the verification or correction of the updated estimation of the distance. Specifically, such an FMCW frequency sweep (or sweeps) is inserted at times determined by:

a. A predetermined time interval or intervals following the determination of the initially estimated distance;
b. A predetermined time interval or intervals following a preceding FMCW frequency sweep;
c. When an updated estimation of the distance has changed in relation to an initially estimated distance by a predetermined value or values;
d. When an updated estimation of the distance has changed in relation to a distance determined based on a preceding FMCW frequency sweep by a predetermined value or values;
e. A time interval determined by a user selecting a configuration of the radar level gauge directly (by selecting a time interval scheme) or indirectly (by selecting a typical measurement situation, such as slow change, rapid change, storage tank, etc, which gauge circuitry translates to a time interval scheme); and/or
f. A time interval determined by a diagnostic function of the radar level gauge producing a tank situation as perceived by the radar level gauge (signal strength, number of echoes, speed of change in level distance, etc).

One or several schemes listed above may be used, possibly in combination with schemes not listed, for enhancing distance measurement performance in the inventive method and system.

In this way, it is possible to reduce considerably the energy consumption rate (or average power consumption) pertaining to the parts of the radar level gauging system that provide the level measurement (the measurement circuitry), without risking any significant degradation of performance or reliability. For instance, let us assume that an MFPW frequency sweep (which includes only a fragmented frequency range) requires one percent (1%) of the energy of a complete FMCW frequency sweep (which may be a continuous or stepped frequency sweep). Let us further assume that the radar level gauge according to the invention has a sweep repetition frequency of two Hertz (2 Hz) and the measurement situation requires a complete FMCW frequency sweep once every sixty seconds (60 s), while MFPW frequency sweeps are sufficient the remaining time. For comparison, this is a reasonable assumption for many measurement situations, wherein surface movements occur at moderate speed or lower. Then, the energy consumption of the measurement circuitry of this inventive radar level gauge becomes approximately (1+119*0.01)/120=0.018=1.8% of the energy consumption of that of a conventional FMCW radar level gauge. Of course, the energy saving may deviate from this figure depending on the measuring situation among other things.

In order for significant power saving to be achieved, the updated estimation of the distance is preferably provided on average at a ratio to said Frequency Modulated Continuous Wave (FMCW) frequency sweep distance measurement, wherein the ratio is greater than a ratio selected from a group consisting of: 2:1, 10:1, 50:1, 100:1, 500:1, and 1000:1. The average may be understood as an average taken over a time period selected from a group consisting of: one second, one minute, one hour, one week, one month, one year, a typical cycle time of a process in which the inventive method and system are applied, and a life of a local power source powering the inventive system.

The person skilled in the art realizes that the present invention by no means is limited to the preferred embodiments described above. On the contrary, many modifications and variations are possible within the scope of the appended claims. For example, the selection of frequencies may be performed in many alternative ways. Further, the details of the transceiver circuitry may be modified in a number of ways, without departing from the inventive concept.

The invention claimed is:

1. A method of providing low power Multiple Frequency Pulsed Wave measurement of a distance to a surface of a product kept in a tank, said method comprising:
    transmitting low power electromagnetic transmit signals towards said surface,
    receiving electromagnetic return signals reflected at said surface,
    determining said distance based on an initially estimated distance and a relationship between said transmit signals and said return signals,
    said transmit signals being formed as a pulse train of distinct carrier wave pulses having a duration greater than one microsecond and shorter than 100 milliseconds,
    said pulse train having an average duty cycle of less than 50 percent,
    each pulse having a defined center frequency, selected according to a frequency scheme within a predetermined frequency range,
    said predetermined frequency range being greater than 5% of an average center frequency,
    determining actual phase properties of each distinct pulse received in relation to each corresponding distinct pulse transmitted,
    determining, based on said initially estimated distance, expected phase properties of each received distinct pulse in relation to each corresponding transmitted distinct pulse, correlating said actual phase properties with said expected phase properties to provide an updated estimation of said distance, and using a Frequency Modulated Continuous Wave (FMCW) frequency sweep distance measurement for at least one of verifying said updated estimation of said distance, correcting said updated estimation of said distance, and providing a new, initially estimated distance.

2. The method according to claim 1, wherein said initially estimated distance is acquired by an initial level measurement.

3. The method according to claim 1, wherein said correlating includes:
determining a distance offset of said distance based on said actual phase properties and said expected phase properties, and
determining said updated estimation of said distance based on said initially estimated distance and said distance offset.

4. The method according to claim 1, wherein said correlating includes determining a relationship between actual phase and carrier wave frequency.

5. The method according to claim 1, further comprising:
homodyne mixing the return signal with the transmit signal in a first channel (I-channel) and homodyne mixing the return signal with a 90° phase shifted transmit signal in a second channel (Q-channel), to provide two amplitude values, and
calculating said phase properties of each distinct received pulse based on said amplitude values.

6. The method according to claim 1, further comprising:
determining a variance of said updated estimation, and
updating said frequency scheme to include a greater number of frequencies if said variance exceeds a predetermined variance threshold.

7. The method according to claim 1, further comprising frequency modulating each carrier wave pulse with a modulation frequency.

8. The method according to claim 7, further comprising:
homodyne mixing the return signal with the transmit signal in a first channel (I-channel) and homodyne mixing the return signal with a 90° phase shifted transmit signal in a second channel (Q-channel), to provide two IF (intermediate frequency) signals,
filtering said IF signals to provide a filtered signal corresponding to a selected harmonic of said modulation frequency,
mixing the filtered signals of each channel with said selected harmonic of said modulation frequency, to provide two amplitude values (I and Q), and
calculating said phase properties of each distinct received pulse based on said amplitude values.

9. The method according to claim 7, wherein the frequency modulation is one of sinusoidal and triangular.

10. The method according to claim 7, wherein the modulation frequency is in the range 10 kHz-100 kHz.

11. The method according to claim 7, wherein the modulation introduces a variation of the carrier frequency in the range 1 MHz-100 MHz.

12. The method according to claim 1, wherein said frequency scheme is determined by:
defining N subsets of frequencies within the predetermined frequency range and randomly selecting one frequency from each subset.

13. The method according to claim 1, wherein each carrier wave frequency is controlled in a fed-back control loop providing a frequency accuracy deviation less than $1/1000$.

14. The method according to claim 1, wherein said predetermined frequency range is greater than 10% of an average center frequency.

15. The method according to claim 1, wherein said duty cycle is less than 5%.

16. The method according to claim 1, wherein said updated estimation of said distance is provided on average more often than said Frequency Modulated Continuous Wave (FMCW) frequency sweep distance measurement.

17. The method according to claim 16, wherein said updated estimation of said distance is provided on average at a ratio to said Frequency Modulated Continuous Wave (FMCW) frequency sweep distance measurement greater than a ratio selected from a group consisting of: 10:1, 50:1, 100:1, 500:1, and 1000:1.

18. The method according to claim 1, wherein each of said Frequency Modulated Continuous Wave (FMCW) frequency sweep distance measurements is inserted at a time determined by:
a. A predetermined time interval or intervals following the determination of the initially estimated distance;
b. A predetermined time interval or intervals following a preceding FMCW frequency sweep;
c. When an updated estimation of the distance has changed in relation to an initially estimated distance by a predetermined value or values;
d. When an updated estimation of the distance has changed in relation to a distance determined based on a preceding FMCW frequency sweep by a predetermined value or values;
e. A time interval determined by a user selecting a configuration of the radar level gauge directly (by selecting a time interval scheme) or indirectly (by selecting a typical measurement situation, such as slow change, rapid change, storage tank, etc, which gauge circuitry translates to a time interval scheme); and/or
f. A time interval determined by a diagnostic function of the radar level gauge producing a tank situation as perceived by the radar level gauge.

19. A Multiple Frequency Pulsed Wave radar level gauging system, for detecting a distance to a surface of a product in a tank, said system comprising:
a transceiver for transmitting low power electromagnetic transmit signals and receiving electromagnetic return signals reflected at said surface,
processing circuitry for determining said distance based on an initially estimated distance and a relationship between said transmit signals and said return signals,
said transceiver being arranged to form said transmit signals as a pulse train of distinct carrier wave pulses having a duration greater than one microseconds and shorter than 100 milliseconds, said pulse train having an average duty cycle of less than 50 percent, each pulse having a defined center frequency, selected according to a frequency scheme within a predetermined frequency range, said predetermined frequency range being greater than 5% of an average center frequency,
said processing circuitry being arranged to:
determine actual phase properties of each distinct pulse received in relation to each corresponding distinct pulse transmitted,
determine, based on said initially estimated distance, expected phase properties of each received distinct pulse in relation to each corresponding transmitted distinct pulse, correlate said actual phase properties with said expected phase properties to provide an updated estimation of said distance, and use a Frequency Modulated Continuous Wave (FMCW) frequency sweep distance measurement for at least one of verifying said updated estimation of said distance, correcting said updated estimation of said distance, and providing a new, initially estimated distance.

20. The system according to claim 19, further comprising:
a first mixer for homodyne mixing the return signal with the transmit signal in a first channel (I-channel) to provide a first amplitude value, and a second mixer for homodyne mixing the return signal with a 90° phase shifted transmit signal in a second channel (Q-channel) to provide a second amplitude value, wherein said processing circuitry is further arranged to calculate said phase properties of each distinct received pulse based on said first and second amplitude values.

21. The system according to claim 19, further comprising a modulator for frequency modulating each carrier wave pulse with a modulation frequency.

22. The system according to claim 21, further comprising:
a first mixer for homodyne mixing the return signal with the transmit signal in a first channel (I-channel) to provide a first IF (intermediate frequency) signal, and a second mixer for homodyne mixing the return signal with a 90° phase shifted transmit signal in a second channel (Q-channel) to provide a second IF (intermediate frequency) signal, filters for filtering said first and second IF signals to provide a filtered signal corresponding to a selected harmonic of said modulation frequency, and mixers for mixing the filtered signal of each channel with said selected harmonic of said modulation frequency, to provide two amplitude values (I and Q), and wherein said processing circuitry is further arranged to calculate said phase properties of each distinct received pulse based on said amplitude values.

23. The system according to claim 21, wherein the modulator is arranged to provide one of sinusoidal and triangular frequency modulation.

24. The system according to claim 21, wherein the modulator is arranged to provide a modulation frequency in the range 10 kHz-100 kHz.

25. The system according to claim 21, wherein the modulator is arranged to introduce a variation of the carrier frequency in the range 1 MHz-100 MHz.

26. The system according to any claim 19, further comprising a fed-back control loop for controlling each carrier wave frequency to provide a frequency accuracy deviation less than $1/1000$.

27. The system according to claim 19, wherein said predetermined frequency range is greater than 10% of an average center frequency.

28. The system according to claim 19, wherein said duty cycle is less than 5%.

29. The system according to claim 19, wherein said updated estimation of said distance is provided on average more often than said Frequency Modulated Continuous Wave (FMCW) frequency sweep distance measurement.

30. The system according to claim 19, wherein said updated estimation of said distance is provided on average at a ratio to said Frequency Modulated Continuous Wave (FMCW) frequency sweep distance measurement greater than a ratio selected from a group consisting of: 10:1, 50:1, 100:1, 500:1, and 1000:1.

31. The system according to any claim 19, wherein each of said Frequency Modulated Continuous Wave (FMCW) frequency sweep distance measurements is inserted at a time determined by:
a. A predetermined time interval or intervals following the determination of the initially estimated distance;
b. A predetermined time interval or intervals following a preceding FMCW frequency sweep;
c. When an updated estimation of the distance has changed in relation to an initially estimated distance by a predetermined value or values;
d. When an updated estimation of the distance has changed in relation to a distance determined based on a preceding FMCW frequency sweep by a predetermined value or values;
e. A time interval determined by a user selecting a configuration of the radar level gauge directly (by selecting a time interval scheme) or indirectly (by selecting a typical measurement situation, such as slow change, rapid change, storage tank, etc, which gauge circuitry translates to a time interval scheme); and/or
f. A time interval determined by a diagnostic function of the radar level gauge producing a tank situation as perceived by the radar level gauge.

* * * * *